Patented Nov. 4, 1924.

1,514,572

UNITED STATES PATENT OFFICE.

HORACE A. SHONLE, OF INDIANAPOLIS, INDIANA, ASSIGNOR TO THE ELI LILLY & COMPANY, OF INDIANAPOLIS, INDIANA, A CORPORATION OF INDIANA.

ISOBUTYL ETHYL BARBITURIC ACID.

No Drawing. Application filed March 21, 1921. Serial No. 454,149.

*To all whom it may concern:*

Be it known that I, HORACE A. SHONLE, a citizen of the United States, residing at Indianapolis, in the county of Marion and State of Indiana, have invented a new and useful Isobutyl Ethyl Barbituric Acid, of which the following is a specification.

My invention has for its object the obtaining of a substance which possesses marked hypnotic activity combined with low toxicity, and relates to the production of the hitherto unknown hypnotic substance, isobutyl ethyl barbituric acid or isobutyl ethyl malonyl urea.

Isobutyl ethyl barbituric acid exhibits pronounced soporific or hypnotic properties, and at the same time has such a low toxicity that the ratio of the toxic dose to the effective hypnotic dose is much greater than in the case of any of the previously known hypnotics of a similar character, thus affording a greater factor of safety. This compound causes no ataxia, but produces a quiet sleep with no disagreeable after effects.

I believe that these advantages are due to the presence of the alkyl branched chain of the isobutyl radical in association with the ethyl radical in the barbituric acid, which two radicals are substituted respectively for the two carbon-linked hydrogen atoms of barbituric acid, and more specifically to the fact that in such alkyl branched chain at least one carbon atom intervenes between the barbituric acid structure and the carbon atom at which the chain branches. That this effect is due to this structural grouping is shown by the fact that di-ethyl barbituric acid is not as active as a hypnotic and has a smaller factor of safety, so that there is greater danger of toxic action from an effective hypnotic dose; that di-isobutyl barbituric acid causes marked muscular incoordination, whereas the isobutyl ethyl barbituric acid does not; and that $n$-butyl ethyl barbituric acid is several times as toxic as isobutyl ethyl barbituric acid.

The new isobutyl ethyl barbituric acid possesses the structure

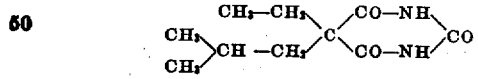

in which one of the hydrogen atoms attached to a nitrogen atom can be replaced by a monovalent metal, such, for instance, as sodium, or by an equivalent of a polyvalent metal, such, for instance, as calcium.

The new isobutyl ethyl barbituric acid may be produced by various processes. One of these consists in condensing urea with isobutyl ethyl malonic ester in the presence of sodium ethylate, using substantially the following quantities, temperatures, and periods of time, although the product may still be obtained in varying yields even if these factors are changed:—

28.2 gram (3 moles) of metallic sodium are dissolved in 500 grams of absolute alcohol, and to this solution are added 100 grams (1 mole) of isobutyl ethyl malonic ester and 39.3 grams (1.6 moles) of urea. This mixture is heated in an enameled autoclave for 4 to 6 hours at a temperature of about 105° C. The isobutyl ethyl barbituric acid formed by this condensation is present as its sodium salt. The mixture is then acidified with hydrochloric acid and the alcohol removed by distillation. The crude isobutyl ethyl barbituric acid remains as a residue in the distilling flask.

This crude isobutyl ethyl barbituric acid upon recrystallization from water is obtained in the form of white crystals, which melt at 174–176° C. The re-crystallized substance is slightly soluble in cold water, more soluble in hot water, and easily soluble in alcohol and ether, and has a slightly bitter taste.

Since isobutyl ethyl barbituric acid possesses one nitrogen-linked hydrogen capable of being replaced with a monovalent metal, such as sodium, or with an equivalent of a polyvalent metal, it is possible to form metallic salts of this acid. The acid and the metallic salts may be represented by the following formula:

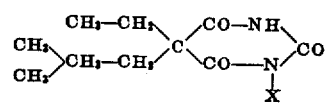

in which X represents either a hydrogen atom or an atom of a monovalent metal or an equivalent of a polyvalent metal. The sodium salt, which may be formed by treating one mole of isobutyl ethyl barbituric acid with one mole of sodium hydroxide in a suitable solvent, is readily soluble in cold water, and somewhat less soluble in absolute alcohol. The soluble salts are of value for hypodermic injection.

The product which is the specific subject of this present application is not the only one which I have produced containing a radicle which is a derivative of the barbituric-acid radicle in which one of the carbon-linked hydrogen atoms is replaced by an ethyl radicle and the other is replaced by an alkyl radicle which has a branched chain in which at least one carbon atom intervenes between the barbituric acid structure and the carbon atom at which the chain branches; as in my co-pending application, Ser. No. 454,150, of even filing date herewith, I have disclosed the product isoamyl ethyl barbituric acid and its salts, which also includes a radicle such as just described. Therefore, in the present application, I am presenting generic claims covering products including this radicle as just described.

I claim as my invention:

1. The new substances, which may be represented by the formula

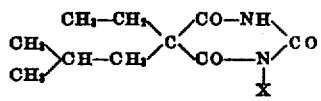

wherein X represents either a hydrogen atom, an atom of a monovalent metal, or an equivalent of a polyvalent metal.

2. The new substance, isobutyl ethyl barbituric acid, being a compound displaying a hypnotic action, crystallizing from water in the form of white crystals melting at 174–176° C., being slightly soluble in cold water, more soluble in hot water, easily soluble in alcohol and ether, having a slightly bitter taste, and forming with the alkali metals salts which are readily soluble in water.

3. A new substance, being a derivative of barbituric acid in which one of the carbon-linked hydrogen atoms is replaced by an ethyl radical and the other is replaced by an alkyl radical which has a branched chain and in which at least one carbon atom intervenes between the barbituric acid structure and the carbon atom at which the chain branches.

4. The new substances, which contain the radicle which may be presented by the formula:

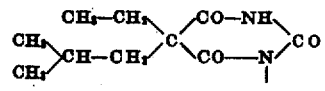

5. The new substances containing a radicle which is that derivative of the barbituric-acid radicle in which one of the two carbon-linked hydrogen atoms of the barbituric-acid radical is replaced by an ethyl radicle and the other is replaced by an alkyl radicle which has a branched chain in which at least one carbon atom intervenes between the barbituric acid structure and the carbon atom at which the chain branches.

In witness whereof, I have hereunto set my hand at Indianapolis, Indiana, this 17th day of March, A. D. one thousand nine hundred and twenty-one.

HORACE A. SHONLE.

Certificate of Correction.

Patent No. 1,514,572.                                   Granted November 4, 1924, to

HORACE A. SHONLE.

It is hereby certified that error appears in the printed specification of the above numbered patent requiring correction as follows: Page 2, claim 1, in the formula, the radical "CH$_3$" on the lower left-hand side of the center symbol "C" and to the right of the radical "CH" should read $CH_2$, and that the said Letters Patent should be read with this correction therein that the same may conform to the record of the case in the Patent Office.

Signed and sealed this 10th day of January, A. D. 1928.

[SEAL.]
                                                       M. J. MOORE,
                                              *Acting Commissioner of Patents.*